Aug. 11, 1942.   C. B. SPANGENBERG   2,292,975
CONTROL APPARATUS
Filed May 12, 1941
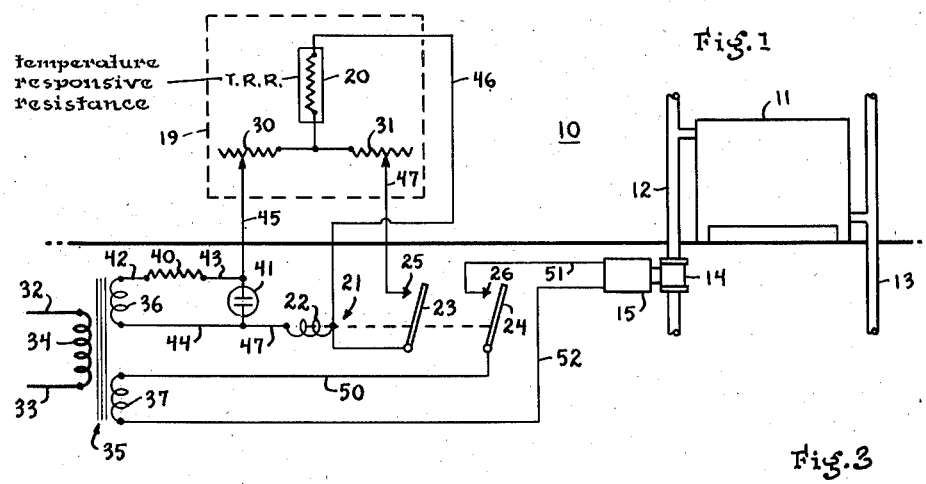
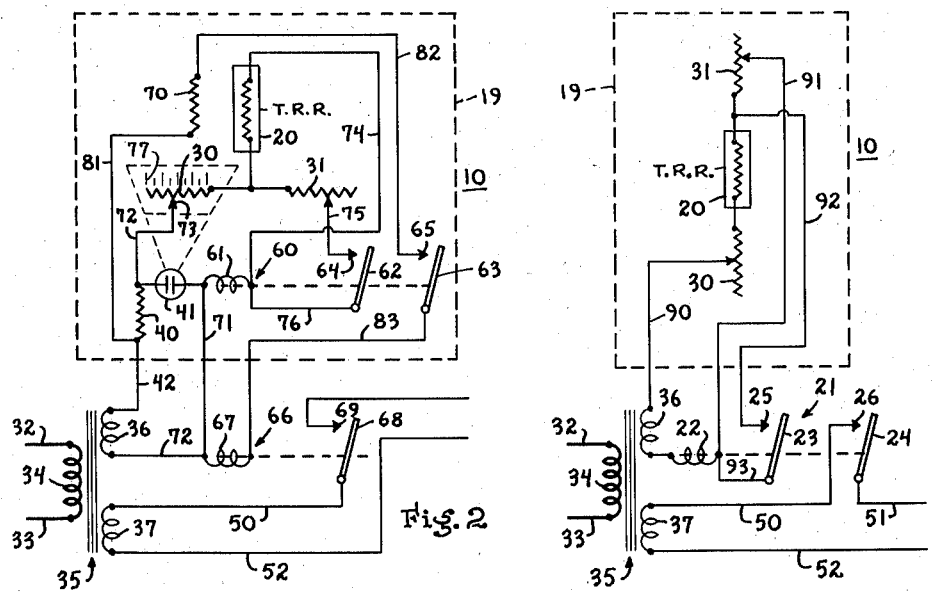
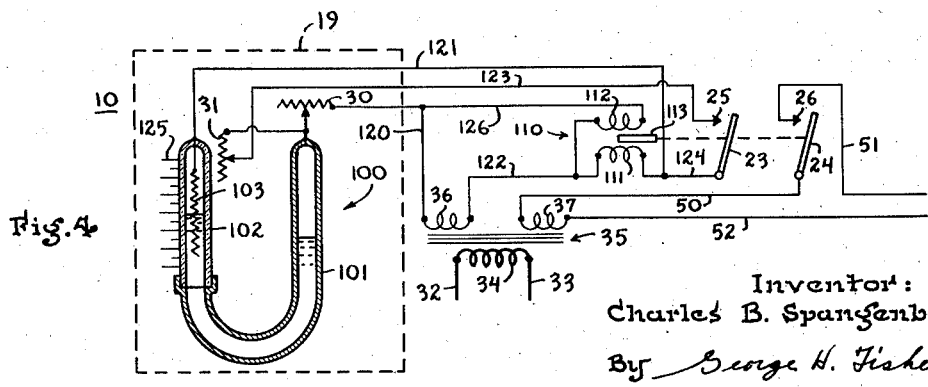
Inventor:
Charles B. Spangenberg
By George H. Fisher
Attorney.

Patented Aug. 11, 1942

2,292,975

UNITED STATES PATENT OFFICE 2,292,975

CONTROL APPARATUS

Charles B. Spangenberg, Philadelphia, Pa., assignor to Minneapolis-Honeywell Regulator Company, Minneapolis, Minn., a corporation of Delaware Application May 12, 1941, Serial No. 393,144

15 Claims. (Cl. 236—68)

This invention relates to resistance thermometers, and to control systems employing such thermometers.

An object of this invention is to provide an improved control system using a variable resistance as a sensitive element.

Another object of the invention is to provide a circuit for controlling a relay by means of a variable resistance element wherein an operating differential is obtained between the resistance value at which said relay pulls in and the value at which it drops out. A further object is to provide such a circuit wherein the operating differential may be readily controlled.

A further object of the present invention is to provide a temperature control system using a variable resistance as a sensitive element and including a heat anticipating device. A still further object is to provide such a temperature control system in which a single variable resistance performs a heat anticipating function and simultaneously controls the temperature differential of the system.

A further object of the invention is to provide, in a relay circuit controlled by a variable resistance, means for compensating the circuit for changes in the supply voltage which might otherwise simulate variations in the controlling resistance.

Another object of the invention is to provide a relay circuit controlled by a resistance element having an appreciable temperature coefficient of resistance. A further object is to provide such a circuit which is adapted for control by a resistance having a positive temperature coefficient.

Other objects and advantages of my invention will be apparent from a consideration of the accompanying claims, specification, and drawing, in which:

Fig. 1 shows diagrammatically a temperature control system embodying certain features of my invention, Fig. 2 shows a modification of the system of Fig. 1 with certain parts omitted, Fig. 3 shows another modification of the system of Fig. 1, and Fig. 4 shows still another modification of my invention.

Fig. 1 shows a system for controlling the temperature of a space 10 which is heated by a radiator 11. A heating fluid, for example, steam or hot water, is supplied to the radiator 11 through a pipe 12 and exhausted fluid is drawn off from the radiator 11 through a return pipe 13.

The supply of heating fluid to the radiator 11 is controlled by a valve 14 in the supply pipe 12. The valve 14 is operated by a suitable mechanism 15 which may be, for example, a solenoid for opening the valve and a spring for biasing the valve to closed position.

Operation of the mechanism 15 is controlled in accordance with the temperature of the space 10 by means of a resistance element 20 of some substance such as nickel having an appreciable temperature coefficient of resistance. The variation in resistance of the element 20 varies the energization of a relay 21 having a winding 22, and adapted to operate switch arms 23 and 24 into engagement with stationary contacts 25 and 26, respectively.

A first manually adjustable resistance 30 is provided for setting the temperature at which the variation in resistance of element 20 becomes effective to cause relay 21 to move the switch arms 23 and 24 into engagement with contacts 25 and 26. A second manually variable resistance 31 is provided for determining the differential between the temperature at which relay 22 pulls in and the temperature at which it drops out.

The resistance elements 20, 30 and 31 may conveniently be mounted in a common housing, schematically shown by the dotted line 19 in the drawing, located in the space 10 whose temperature is being controlled. Electrical energy is supplied to the system through a pair of supply lines 32 and 33 connected to primary winding 34 of a transformer 35 which is also provided with secondary windings 36 and 37. A ballast resistance 40 and a gaseous discharge tube 41 such as, for example, a neon lamp, are provided for purposes to be described later.

Operation of Figure 1

The neon lamp 41 is connected in series with the ballast resistance 40 across the terminals of secondary winding 36 through a circuit which may be traced from the upper terminal of secondary winding 36 through a conductor 42, ballast resistance 40, a conductor 43, neon lamp 41, and a conductor 44 to the lower terminal of secondary winding 36. As is well known, such a circuit provides a substantially constant potential drop across the lamp 41, regardless of variations in the potential of secondary winding 36, such as are usually encountered in commercial power sources.

The constant potential drop across the lamp 41 is used to supply a circuit which may be traced from the upper terminal of lamp 41 through a conductor 45, adjustable resistance 30, temperature responsive resistance 20, a conductor 46, relay winding 22, and a conductor 47 to the lower terminal of lamp 41. The current flowing through this circuit depends upon the magnitude of variable resistance 30 and of temperature responsive resistance 20. Since the resistance of element 20 varies with the temperature of the space 10, it may be seen that the value to which resistance 30 is adjusted determines the value of temperature in the space 10 at which the variation of resistance element 20 increases the energization of winding 22 sufficiently so that switch arms 23 and 24 are operated against the contacts 25 and 26. When the switch arms are engaged with their respective contacts, the relay 21 is said to be in its "in" position.

When the relay is in its "out" position, as shown in the drawing, the temperature in the space 10 is above the value determined by the resistance 30 as the temperature at which the relay 22 is to be pulled in. Let it now be assumed that the temperature in the space 10 decreases. As the temperature in the space 10 decreases, the current flowing through the relay winding 22 increases due to the change in resistance element 20. When the temperature in the space 10 reaches the value which has been pre-selected by the adjustment of resistance 30, the relay winding 22 is energized to such an extent that the relay pulls in, moving switch arm 23 into engagement with contact 25.

This completes a holding circuit which may be traced from the upper terminal of lamp 41 through conductor 45, resistance 30, variable resistance 31, a conductor 47, contact 25, switch arm 23, winding 22, and conductor 47 to the lower terminal of lamp 41. Completion of this holding circuit increases the current flowing through the relay winding 22. This current is the sum of the current flowing through the variable resistance element 20 and that flowing through the adjustable resistance 31.

Pulling in of relay 21 also closes switch arm 24 against contact 26, thereby completing an energizing circuit for operating mechanism 15 of valve 14. This circuit may be traced from the upper end of transformer secondary winding 37 through a conductor 50, switch arm 24, contact 26, a conductor 51, operating mechanism 15, and a conductor 52, to the lower end of secondary winding 37. Energization of the operating mechanism 15 causes opening of the valve 14, thereby supplying heating fluid to the radiator 11 and tending to raise the temperature of the space 10.

As the temperature in the space 10 increases, the resistance of element 20 also increases, thereby reducing the amount of current flowing through relay winding 22. Since this relay winding current has been increased by the current flowing through the adjustable resistance 31, the energization of relay winding 22 is not decreased sufficiently to cause the relay to drop out until the temperature in the space 10 has increased to such a point that the increase in resistance of element 20 reduces the current flow through winding 22 by an amount equal to the current flowing through adjustable resistance 31. When that point is reached, the current flow through winding 22 is exactly equal to that which originally caused the relay to pull in. Any further increase in the temperature of the space 10 will cause the current through winding 22 to decrease below that value, thus allowing the relay 21 to drop out, thereby opening the holding circuit and deenergizing the operating mechanism 15 of valve 14. Deenergization of operating mechanism 15 allows valve 14 to close under the influence of its bias. The supply of heat to the radiator 11 is thereby discontinued.

It will be seen from this description of the operation of the system shown in Fig. 1, that by adjusting the value of resistance 31, the differential between the temperature at which the system calls for delivery of heat to the space 10 and the temperature at which the system calls for discontinuance of said heat supply, is varied.

It is well known in the art of temperature control that such a differential should exist, in order that the source of heat may operate for an appreciable amount of time whenever it is placed in operation. This is necessary in order that the heat supply means may operate efficiently. It is also desirable, however, that the temperature differential be kept as small as possible, consistent with efficient furnace operation, in order that objectionable variations in the temperature of the space being controlled will not be produced. In the present invention, such a differential is obtained in connection with a system using a temperature responsive resistance element. Furthermore, the present invention provides means whereby this temperature differential may be adjusted to suit the requirements of various heating systems.

By placing the resistance 31 adjacent the temperature responsive resistance element 20, the applicant secures a heat anticipating effect in his system. After the resistance 31 has been connected in the circuit for a predetermined time, depending upon the characteristics of the resistance material and the space between elements 31 and 20, the temperature of resistance 31 will rise, and heat will be transmitted from it to the element 20, thereby simulating an increase in room temperature. The resistance of element 31 and the spacing of elements 31 and 20 are designed, in a manner well known in the temperature control art, so that the heat supplied to resistance 20 by resistance 31 increases in substantially the same manner as the heat stored in the heating system (in this case the radiator 11). The heat supplied by resistance 31 is therefore said to anticipate the delivery of the stored heat to the room or space being heated. This anticipation effect causes the system to cut off the supply of heat to the radiator before the room temperature has reached its desired value, and the heat stored in the radiator is thereafter dissipated in the room, bringing the temperature up to the desired value without overshooting.

*Figure 2*

Figure 2 discloses a modification of the system shown in Figure 1 wherein a cascaded relay arrangement is used to increase the contact pressure on the main relay. In this system, lamp 41 is used to illuminate adjustable contact 73 which cooperates with the resistance 30, so that the position of the contact will indicate the temperature setting of the thermostat on a scale 77 adjacent thereto. Elements in Figure 2 which are the full equivalent of corresponding elements in Figure 1 bear the same reference numerals.

In Figure 2 a relay 60 is provided having a winding 61 which operates switch arms 62 and 63 into engagement with contacts 64 and 65, respectively. A second relay 66 is provided having a winding 67 operating switch arm 68 into engagement with a contact 69. A separate heat anticipating resistance 70 is also provided in this modification of my invention.

Operation of Figure 2

In Figure 2, the circuit which supplies lamp 41 and serves to establish a constant potential thereacross may be traced from the upper terminal of secondary winding 36 through conductor 42, ballast resistance 40, lamp 41, a conductor 71, and conductor 72 to the lower terminal of secondary winding 36.

The constant potential established across the lamp 41 supplies an energizing circuit for relay winding 61 which may be traced from the left-hand terminal of lamp 41 through a conductor 72, movable contact 73, resistance 30, temperature responsive resistance 20, a conductor 74, and relay winding 61 to the right-hand terminal of lamp 41.

When the parts are in the position shown in the drawing, the temperature in the space 10 is above the value at which the system has been set to cause operation of the heater. Let it now be assumed that the temperature in the space 10 decreases below that value. As this temperature decreases, the current flow through the circuit last traced increases until it becomes sufficient to energize winding 61 and causes the relay 60 to close switch arms 62 and 63 against contacts 64 and 65, respectively.

Closure of switch arm 62 against contact 64 completes a holding circuit for relay winding 61. This holding circuit may be traced from the left-hand terminal of lamp 41 through a conductor 72, movable contact 73, resistance 30, resistance 31, a conductor 75, contact 64, switch arm 62, a conductor 76, and winding 61 to the right-hand terminal of lamp 41.

Closure of switch arm 63 against contact 65 completes an energizing circuit for winding 67 of relay 66 and for heat anticipating resistance 70. This circuit may be traced from the upper terminal of secondary winding 36 through conductor 42, a conductor 81, resistance 70, a conductor 82, contact 65, switch arm 63, a conductor 83, winding 67, and a conductor 72 to the lower terminal of said secondary winding 36.

Energization of winding 67 causes switch arm 68 to be operated against contact 69 thereby completing an energizing circuit for suitable heating mechanism (not shown).

In the system of Figure 2 the voltage available for energization of winding 67 is the total voltage across secondary winding 36 minus the voltage across heat anticipating resistance 70. The resistances of the various elements are such that this potential is much greater than that across the lamp 41 which is available for operating the relay 61. Therefore relay 66 operates switch arm 68 against contact 69 with a much heavier contact pressure than is obtainable in relay 60. In this manner erratic operation of the heater because of a poor contact in its energizing circuit is prevented.

By having relay 60 located in the thermostat housing, as indicated in Figure 2, I have provided a circuit in which the connecting leads are short and of fixed length. In a circuit including a temperature responsive resistance of the type described, wherein small variations in the resistance element are important, the calibration of the system may be changed by any appreciable change in the length of the connecting leads. If systems such as that shown in Figure 1, for instance, were installed in two different buildings, with different distances between each temperature responsive element and its associated relay, the different lead lengths would affect the calibration of the systems, so that each system would have to be calibrated after installation. With the system shown in Figure 2, however, the housing for the temperature responsive element may be installed at any convenient distance from the main control relay 67. Since the circuit which includes the resistance element 20 of Figure 2 is entirely located within the housing 19, the length of the leads connecting the housing and the main control relay will not affect the calibration of the system. Likewise, these short leads for the sensitive circuit substantially eliminate stray capacitance effects, which might adversely affect the operation of a system using long leads.

The function of heat anticipating resistances such as 70 in Figure 2 is well known in the art, this function being to increase the frequency of operation of the heater. In other words, it may be stated that its function is to decrease the effective differential of the temperature responsive element, while maintaining its actual differential at a sufficiently large value that chattering of the relay contact is prevented.

Figure 3

Figure 3 discloses a system in which the temperature differential is obtained in a somewhat different manner than in the system of Figure 1. In Figure 3 elements which are the full equivalent of those in Figure 1 bear the same reference numerals. In this system, the holding circuit shunts a resistance in the energizing circuit for the relay 22, rather than connecting an additional resistance in parallel with the temperature responsive element 20.

The energizing circuit for relay winding 22 may be traced from the upper terminal of transformer secondary 36 through a conductor 90, resistance 30, temperature responsive resistance 20, adjustable resistance 31, a conductor 91, winding 22, and the lower terminal of the secondary winding 36.

When the temperature of the space 10 decreases below the value which the system has been set to maintain by the adjustable resistance 30, the relay 22 pulls in, causing engagement of switch arm 23 with contact 25.

Engagement of switch arm 23 with contact 25 completes a holding circuit for winding 22, which may be traced from the upper terminal of secondary winding 36 through conductor 90, resistance 30, temperature responsive resistance 20, a conductor 92, contact 25, switch arm 23, a conductor 93, and winding 22 to the lower terminal of secondary winding 36.

Completion of this holding circuit shunts the resistance 31 in the energizing circuit for relay winding 22, thereby increasing the flow of current through winding 22. This increase in the current flowing through winding 22 must be overcome by a corresponding increase in the resistance of temperature responsive element 20 before the relay can be dropped out. It is therefore apparent that the circuit shown in Figure 3 produces a differential between the temperature at which the relay is pulled in and the temperature at which the relay drops out. The differential is obtained, however, in a somewhat different manner than that indicated in Figures 1 and 2.

Figure 4

Figure 4 shows a system in which a somewhat different type of temperature responsive element is used. In this figure also a different means of compensating the system for changes in the supply voltage is shown and the differential adjusting resistance functions also as a heat anticipating resistance. Elements in Figure 4 which are the full equivalent of the corresponding elements in Figure 1 are given the same reference numerals.

In Figure 4 the temperature responsive element consists of a U-tube 100, having one section 101 of metal and another section 102 of glass or other non-conductive material. The U-tube 100 contains a quantity of mercury in the lower part of the U. A resistance element 103 is mounted within the upper part of the glass portion 102, and the space above the mercury in that portion is filled with a gas or vapor having a suitable temperature expansion characteristic.

The gas or vapor in section 102 expands and contracts with changes in temperature, thereby causing the level of the mercury in that section to rise and fall. A scale 125 may be provided adjacent the glass section 102 in order that the mercury level may indicate the temperature.

A relay 110 in the system of Figure 4 has a pair of oppositely wound coils 111 and 112. These windings cooperate to control an armature 113 which is operatively connected to switch arms 23 and 24, the latter being the equivalent of the switch arms 23 and 24 of Figure 1.

*Operation of Figure 4*

Winding 112 is continuously energized through a circuit which may be traced from the left hand end of transformer secondary winding 36 through conductors 120 and 126, winding 112 and a conductor 122 to the right hand terminal of secondary winding 36.

Winding 111 is wound so that the magnetic flux produced by current flowing through it opposes the flux produced by the current flowing in winding 112. The two windings are so proportioned that winding 111 may produce a greater flux than winding 112. An energizing circuit for winding 111 may be traced from the left hand end of secondary winding 36 through conductor 120, resistance 30, metal tube 101, the mercury in the tube, resistance 103, a conductor 121, winding 111, and conductor 122 to the right hand terminal of secondary winding 36. A holding circuit for winding 111 may be traced from the left hand end of secondary winding 36 through conductor 120, resistance 30, resistance 31, a conductor 123, contact 25, switch arm 23, a conductor 124, winding 111, and conductor 122 to the right hand end of secondary winding 36.

As the temperature in the space 10 increases, the gas or vapor above the mercury in the left hand leg of the U-tube expands, thereby forcing the mercury downwards and inserting in the energizing circuit of winding 111 an increasing proportion of resistance 103. The effect of the resistance of element 103 is therefore increased as the temperature rises, causing a decrease in the current flowing through the energizing circuit for winding 111.

The armature 113 is biased by means not shown, for movement to the right hand position in which it appears in the drawing. When the parts are in the positions shown in the drawing, the temperature in the space 10 is above the value which the system has been set to maintain. Under these conditions, the flux produced by the current flowing in winding 112 has substantially neutralized the flux produced by the current flowing through winding 111, and the normal bias of the armature has caused it to move to its right hand position. By such movement the switch arms 23 and 24 are separated from contacts 25, and 26, respectively.

By way of example, let it be assumed that the system has been set to maintain the temperature in space 10 between the limits of 70° and 72°. Under such an assumption, the conditions just described above would be obtained when the temperature was above 72°.

Let it now be assumed that the temperature in the space 10 decreases until it falls below 70°. This decrease in temperature causes a contraction of the gas or vapor above the mercury in the left hand leg of the U-tube thereby causing the mercury level in the left hand leg to rise and decreasing the effect of resistance of element 103. This increases the current flowing in the energizing circuit for winding 111. The setting of variable resistor 30 is such that when a temperature of 70° or lower occurs, the current flow through the energizing circuit for winding 111 produces a magnetic effect which overcomes the magnetic effect of winding 112 and the bias of armature 113, thereby attracting the armature to its left hand position and closing switch arms 23 and 24 against contacts 25 and 26, respectively.

Closure of contact 24 against contact 26 completes an energizing circuit for the heater (not shown) which may be traced from the left hand end of secondary windings 37 through conductor 50, switch arm 24, contact 26, conductor 51, the heater, and conductor 52 to the right hand end of secondary winding 37.

Engagement of switch arm 23 with contact 25 completes the holding circuit for winding 111, previously traced. The current flowing through winding 111, and hence the magnetic effect of that winding, is increased by the current through the holding circuit.

Energization of the heater now causes a rise in temperature in the space 10. This rise in temperature acts in the manner previously explained to increase the effect of resistance of element 103, thereby decreasing the current through winding 111. When this increase in temperature has continued until the space temperature rises above 72°, the current through winding 111 is decreased until the magnetic effect of winding 112, aided by the bias of armature 113, is sufficient to overcome the magnetic effect of winding 111, and move the armature to its right hand position. This movement opens heater energizing circuit at contact 26 and also opens the holding circuit for winding 111 at contact 25.

By adjusting the value of resistance 31, the current supplied to winding 111 by the holding circuit may be varied. By variation of this current the rise in temperature necessary before winding 112 overcomes winding 111 and causes the relay to drop out may be changed. It is therefore apparent that adjustment of the value of resistor 31 serves to adjust the differential between the temperature at which the system calls for heater operation and the temperature at which the system calls for shut down of the heater.

As in Figure 1, the resistance 31 may be mounted adjacent the temperature sensitive element so as to provide a heat anticipating effect.

Since the windings 111 and 112 are oppositely wound any changes in the potential of the source of electrical energy are reflected by currents flowing in opposing directions in the two coils. The magnetic effects of these two currents are therefore neutralized. Because of this neutralization of currents due to fluctuations in the potential of the source, it will be seen that such fluctuations cannot cause a change in the force attracting armature 113 in such a manner as to simulate a change in the temperature of space 10.

While I have shown and described preferred embodiments in my invention, it should be understood that I do not wish to be limited by the description herein, but only by the scope of the appended claims.

I claim as my invention:

1. A condition control system, comprising in combination, condition changing means, a circuit for controlling the operation of said condition changing means, relay means having a winding and a movable armature, an impedance variable in accordance with a condition indicative of the need for operation of said condition changing means, a source of electrical energy, an energizing circuit for said winding including said source, said impedance and said winding in series, a holding circuit including said winding and having a portion in parallel with a portion of said energizing circuit, said holding circuit, when closed, tending to increase the flow of current in said winding, and switch means operated by said armature for closing said controlling circuit and said holding circuit.

2. A condition control system, comprising in combination, condition changing means, a circuit for controlling the operation of said condition changing means, relay means having a winding and a movable armature, an impedance variable in accordance with a condition indicative of the need for operation of said condition changing means, a source of electrical energy, an energizing circuit for said winding including said source, said impedance and said winding in series, a holding circuit including said winding and having a portion in parallel with a portion of said energizing circuit, said holding circuit, when closed, tending to increase the flow of current in said winding, a variable impedance element in the parallel portion of said holding circuit for controlling the increased flow of current due to closure of said holding circuit, and switch means operated by said armature for closing said controlling circuit and said holding circuit.

3. A temperature control system, comprising in combination, heating means, an electrical circuit for controlling the operation of said heating means, first switch means for opening and closing said circuit, relay means controlling said first switch means and having a winding, resistance means variable in accordance with a temperature indicative of the need for operation of said temperature changing means, electrical circuit means connecting said resistance means and said winding so that the energization of said winding varies in accordance with the resistance of said resistance means, a second resistance connectable in said circuit means so as to modify the relationship between the energization of said winding and the resistance of said first mentioned resistance means, and second switch means for effectively connecting and disconnecting said second resistance from said circuit means, said first and second switch means being simultaneously operated by said relay means.

4. A temperature control system, comprising in combination, heating means, an electrical circuit for controlling the operation of said heating means, first switch means for opening and closing said circuit, relay means controlling said first switch means and having a winding, resistance means variable in accordance with a temperature indicative of the need for operation of said temperature changing means, electrical circuit means connecting said resistance means and said winding so that the energization of said winding varies in accordance with the resistance of said resistance means, a second resistance connectable in said circuit means so as to modify the relationship between the energization of said winding and the resistance of said first mentioned resistance means, and second switch means for effectively connecting and disconnecting said second resistance from said circuit means, said first and second switch means being simultaneously operated by said relay means, said second resistance being mounted adjacent said variable resistance means, said first and second switch means being effective simultaneously to start operation of said heating means and to effectively connect said second resistance in said circuit means so that heat is supplied to said variable resistance means due to the flow of current through said second resistance.

5. A temperature control system, comprising in combination, temperature changing means, an electrical circuit for controlling the operation of said temperature changing means, relay means having a winding, a pair of switches operated by said relay means, one of said switches being in said control circuit, a resistance element having an appreciable temperature coefficient of resistance and exposed to a temperature indicative of the need for operation of said temperature changing means, a source of constant electrical potential, an electrical network connecting said source, said element and said winding so that the magnitude of said resistance determines the degree of energization of said winding, a second resistance element, the other of said switches being effective to connect said second resistance in said network so as to vary the degree of energization determined by said first impedance, and a third resistance element of manually variable magnitude permanently connected in said network.

6. A condition control system, comprising in combination, condition changing means, a circuit for controlling the operation of said condition changing means, relay means having a pair of windings with opposing magnetic effects and a movable armature, first switch means in said controlling circuit operated by said armature, an impedance variable in accordance with a condition indicative of the need for operation of said condition changing means, a source of electrical potential subject to irregular variations, electrical connections between said source, one of said windings and said impedance so that the magnitude of said impedance determines the degree of energization of said one winding, a second impedance, second switch means for arranging said connections to include said second impedance so as to vary the degree of energization determined by said first impedance, said second switch means being operated by said armature, and connections between the other of said windings and said source, so that variations in the potential of said source produce equal and opposite magnetic effects in said relay and no movement of said armature, but variations of said first-mentioned impedance cause movement of said armature.

7. A temperature control system, comprising in combination, temperature changing means, an electrical circuit for controlling the operation of said temperature changing means, first and second relay means, each said relay means having a winding, a pair of switches operated by said first relay means, a switch in said control circuit operated by said second relay means, a resistance element having an appreciable temperature coefficient of resistance and exposed to a temperature indicative of the need for operation of said temperature changing means, a source of constant electrical potential, an electrical circuit connecting said source, said element and the winding of said first relay means so that the magnitude of said resistance determines the degree of energization of said first winding, a second resistance element, one of said pair of switches being effective to connect said second resistance in said circuit so as to vary the degree of energization determined by said first impedance, a heater element adjacent said resistance element, and a second circuit connecting said heater and the winding of said second relay with the other of said pair of switches so that both said heater and said second winding are energized upon actuation of said other switch.

8. A temperature control system, comprising in combination, temperature changing means, an electrical circuit for controlling the operation of said temperature changing means, relay means having a winding, a pair of switches operated by said relay means, one of said switches being in said control circuit, a resistance element having an appreciable temperature coefficient of resistance and exposed to a temperature indicative of the need for operation of said temperature changing means, a source of electrical energy, a second resistance element, a third resistance element of manually variable magnitude, an electrical circuit connecting said source, said elements and said winding in series so that the magnitude of said resistances determines the degree of energization of said winding, means including the other of said switches for shunting said second resistance element so as to vary the degree of energization determined by said first and third resistances.

9. A temperature control system, comprising in combination, temperature changing means, an electrical circuit for controlling the operation of said temperature changing means, relay means having a winding, a pair of switches operated by said relay means, one of said switches being in said control circuit, a first resistance element having an appreciable temperature coefficient of resistance and exposed to a temperature indicative of the need for operation of said temperature changing means, a source of constant electrical potential, a second resistance element of manually variable magnitude, and an electrical network connecting said source, said first resistance element and said winding in series so that the magnitude of said impedance determines the degree of energization of said winding, the other of said switches being effective to connect said second resistance element in parallel with said first resistance element so as to vary the degree of energization determined by said first resistance.

10. A condition control system, comprising in combination, condition changing means, a circuit for controlling the operation of said condition changing means, relay means having a winding and a movable armature, first switch means in said controlling circuit operated by said armature, a first impedance variable in accordance with a condition indicative of the need for operation of said condition changing means, a source of electrical energy, an electrical circuit connecting said source, said winding and said first impedance in series so that the magnitude of said impedance determines the degree of energization of said winding, a second impedance of manually variable magnitude, and second switch means for connecting said second impedance in parallel so as to vary the degree of energization determined by said first impedance, said second switch means being operated by said armature.

11. A condition control system, comprising in combination, condition changing means, a circuit for controlling the operation of said condition changing means, relay means having a winding and a movable armature, first switch means in said controlling circuit operated by said armature, a first impedance variable in accordance with a condition indicative of the need for operation of said condition changing means, a source of electrical energy, a second impedance of manually variable magnitude, an electrical circuit connecting said source, said winding and said impedances in series so that the magnitude of said impedances determines the degree of energization of said winding, and second switch means for shunting said second impedance so as to vary the degree of energization of said winding, said second switch means being operated by said armature.

12. A condition control system, comprising in combination, condition changing means, a circuit for controlling the operation of said condition changing means, relay means having a winding and a movable armature, first switch means in said controlling circuit operated by said armature, an impedance variable in accordance with a condition indicative of the need for operation of said condition changing means, a source of electrical energy, electrical connections between said source, said winding and said impedance so that the magnitude of said impedance determines the degree of energization of said winding, a second impedance, and second switch means for arranging said connections to include said second impedance so as to vary the degree of energization determined by said first impedance, said second switch means being operated by said armature.

13. A temperature control system, comprising in combination, temperature changing means, an electrical circuit for controlling the operation of said temperature changing means, relay means having a winding and a movable armature, a pair of switches operated by said armature, one of said switches being in said control circuit, a resistance variable in accordance with a temperature indicative of the need for operation of said temperature changing means, a source of electrical energy, electrical connections between said source, said winding, and said resistance so that the magnitude of said resistance determines the degree of energization of said winding, a second resistance mounted adjacent said first resistance, said other switch means being effective to arrange said connections to include said second resistance so as to vary the degree of energization determined by said first resistance, said switches operating to include said second resistance in said connections when said temperature changing means is operating, so that heat is supplied to said variable resistance due to the flow of current through said second resistance.

14. A temperature control system, comprising in combination, temperature changing means, an electrical circuit for controlling the operation of said temperature changing means, relay means having a winding and a movable armature, a pair of switches operated by said armature, one of said switches being in said control circuit, a resistance variable in accordance with a temperature indicative of the need for operation of said temperature changing means, a first circuit for energizing said winding including said winding and said resistance in series, a second circuit for maintaining energization of said winding including the other of said pair of switches and having a portion in parallel with a portion of said first circuit, and a manually variable resistance in one of said parallel portions to determine the relative amounts of current flowing in said circuits.

15. A temperature control system, comprising in combination, temperature changing means, electrical control means for said temperature changing means, a first resistance variable in accordance with a temperature indicative of the need for operation of said temperature changing means, a second resistance of manually variable magnitude mounted adjacent said first resistance and adapted when energized to heat said first resistance, a first energizing circuit for said control means including said first resistance, a second energizing circuit for said control means including said second resistance, and means operated by said control means for controlling said second circuit.

CHARLES B. SPANGENBERG.